April 16, 1963    R. L. HACKMAN ET AL    3,086,103
REFRACTORY ELECTRODE-INERT GAS SHIELDED-ARC WORKING
Filed March 28, 1961
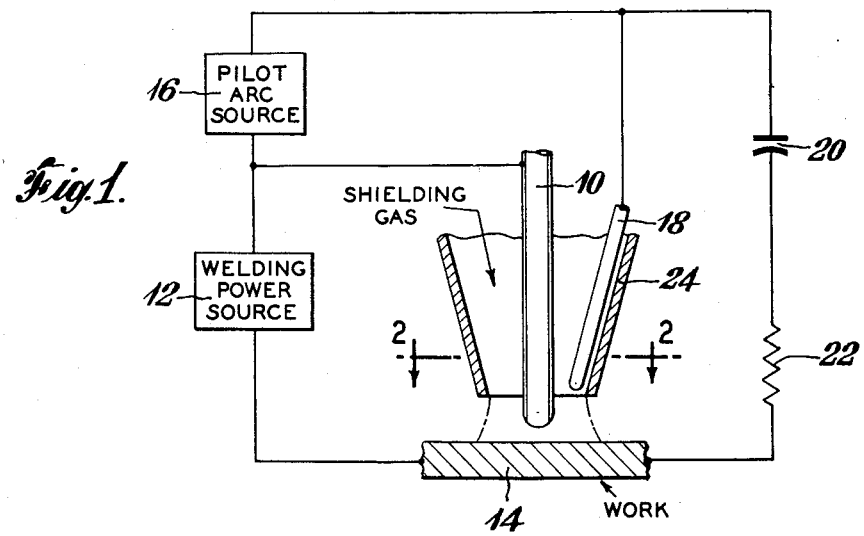
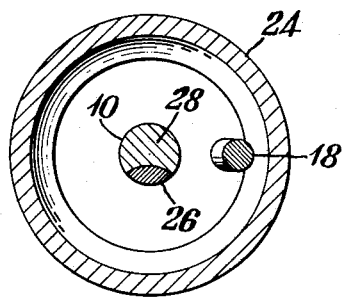
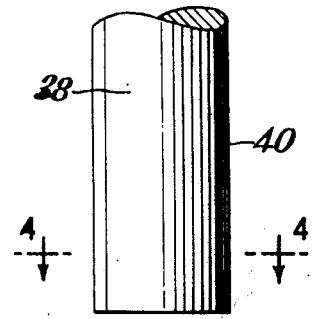
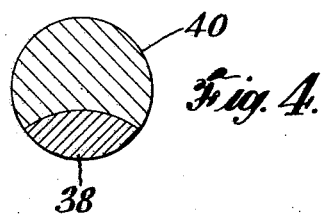
INVENTORS
ROBERT L. HACKMAN
AUGUST F. MANZ
BY Barnwell P. King
ATTORNEY ём
United States Patent Office 3,086,103
Patented Apr. 16, 1963

3,086,103
REFRACTORY ELECTRODE-INERT GAS
SHIELDED-ARC WORKING
Robert L. Hackman, Morris Plains, and August F. Manz, Newark, N.J., assignors to Union Carbide Corporation, a corporation of New York
Filed Mar. 28, 1961, Ser. No. 98,799
3 Claims. (Cl. 219—74)

This invention relates to arc working, and more particularly to work-in-circuit arc working with a refractory metal electrode in a stream of inert gas which protects the operation from contamination due to ambient air.

In pilot arc starting originally it was necessary to ignite the pilot arc by short-circuiting a piece of tungsten between the welding electrode and an auxiliary electrode. More recently, as disclosed in application Serial No. 36,941, filed June 17, 1960, a method of inductive impulse starting was used wherein the inductance of the smoothing choke of the pilot arc supply is utilized to produce an impulse of several thousand volts, which is sufficient to break down the gap between the welding electrode and the auxiliary or pilot arc electrode, causing the pilot arc to be formed. A welding torch incorporating a main welding electrode and a pilot electrode for such impulse starting is disclosed in application Serial No. 78,051, filed December 23, 1960.

When utilizing such torch with straight polarity, the welding electrode is customarily 1 or 2 percent thoriated tungsten. In such case, extremely reliable impulse starting is obtained. When welding aluminum, A.C. power is preferred and a pure tungsten electrode is preferable to a thoriated electrode inasmuch as the latter tends to spit and the electrode end will not "ball." On the other hand, pure tungsten electrodes do not spit and the balled end which forms produces a more stable A.C. arc. Unfortunately, when attempting to utilize impulse starting with pure tungsten electrodes, sufficient electron emission is not obtained; and, as a result, a stable pilot arc is rarely ignited. Even when such ignition is obtained, the pilot arc generally snuffs out after a few seconds to a minute's duration. While a new pure tungsten electrode with sharp edges on the blunt end may start with "impulsing," the balled end subsequently formed by the welding arc blocks subsequent attempts to ignite and maintain a pilot arc.

In our investigations it has been observed, however, that when only a small degree of contamination is present on an otherwise pure tungsten electrode, the thermionic emission level is apparently raised high enough to permit satisfactory impulse starting and the maintenance of a stable pilot arc. During subsequent welding action, the welding arc generally burns off or dissipates such contamination and impulse starting and maintenance of a pilot arc again becomes highly unreliable. However, since the amount of contamination necessary to obtain satisfactory results appeared small, this suggested that perhaps one half-percent thoriated electrodes would provide sufficient starting emission and yet ball like a pure tungsten electrode. Accordingly, half-percent thoriated electrodes were evaluated. It was found that the starting characteristics were essentialy the same as pure tungsten, i.e., unsatisfactory, but the end of the electrode formed a ball the same as pure tungsten.

Since electrodes containing 0.5 percent thoria acted essentially like pure tungsten, i.e., formed a balled end and did not spit, the presence of such an amount of thoria did not in any way affect favorable welding characteristics as compared with a pure tungsten electrode. It was therefore conceived, that if such a thoria content (0.5 percent) were concentrated in a specific limited area (cross-sectional area) wherein said thoriated area constitutes at least a sector of the longitudinal surface area of the entire electrode, this limited area could have its thoria content increased to a value of 1 to 2 percent. It is well known to the art, that 1 to 2 percent thoriated tungsten electrodes having a homogeneous cross-sectional dispersion of thoria exhibit good starting characteristics since the thoria available on the surface of the electrode produced sufficient emission for arc initiation. This favorable starting characteristic is exhibited in both pilot-arc and high-frequency starting.

Since at least a portion of the surface area of the composite electrode likewise exhibits substantially the same surface content as the conventional thoriated tungsten electrode, the composite electrode therefore provides in an localized area substantially the same high level of emissivity for arc initiation.

Electrodes with this laminated or composite characteristic produced new and novel welding results in addition to providing the desired starting characteristics which precipitated the original investigation. These composite electrodes were found to exhibit an A.C. current rating at least as high as a 2 percent thoriated tungsten electrode, yet exhibited the balling characteristics and absence of spitting characteristic of pure tungsten electrodes. Further, the ball which forms on the composite electrode grows in size with increasing current, as compared with a pure tungsten electrode where the ball forms only above a certain current level. As a result, the current density on the balled-end of the composite electrode, tends to remain constant within the capacity of the electrode. This constant density is the highest current density which the balled end is capable of carrying without increasing in size. Thus, since at any given current the arcing area on the ball provides the maximum current density, there is a complete absence of arc instability.

In the drawing:
FIG. 1 is a circuit diagram of a welding set-up illustrating the invention;
FIG. 2 is an enlarged cross-sectional view of the torch taken on line 2—2 of FIG. 1;
FIG. 3 is an enlarged fragmentary view in side elevation of a composite electrode; and
FIG. 4 is a cross-section of the composite electrode taken on line 4—4 of FIG. 3.

As shown in FIG. 1, a main electrode 10 is electrically connected to one side of a welding power source 12 the other side of which is electrically connected to the work 14 to energize a welding arc between the end of such electrode 10 and work 14 during the welding operation. A pilot arc source 16 is electrically connected across electrode 10 and an inclined auxiliary electrode 18 to energize a pilot arc between the end of such auxiliary electrode 18 and the main electrode 10. An RC circuit containing a condenser 20 and a resistor 22 is connected between the auxiliary electrode 18 and the work 14. The electrodes 10 and 18 are located in a cup or nozzle 24 of the welding torch, through which a suitable shielding gas, such as argon flows for discharge in the direction of the work 14 to protect the arc welding operation from contamination by the ambient air.

The main or welding electrode 10 is a composite elongated rod of pure tungsten and thoriated tungsten providing a composite stick the base 28 of which is pure tungsten provided with a lateral segment 26 of thoriated tungsten which extends throughout the length of the electrode.

As shown in FIGS. 3 and 4, the thoria or other emissive material is not a surface coating which may be easily dissipated, but rather is a lateral segment 38 of thoria-rich tungsten (extending along the length of the electrode) which occurs to some depth in the basic tungsten body 40. This approach is predited upon the understanding that there is no known case in which a thoriated welding electrode during its normal life expectancy was ever depleted of thoria content by arcing action to a point where effective emission was substantially lost. Thus, any surface loss of thoria is slowly replaced by diffusion of the thoria to the surface of the electrode.

Metallographic studies indicate that the precise mechanism involves the reduction of thoria within the electrode to thorium metal which has considerably higher mobility for diffusion to the surface of the electrode. The surface thorium is then reoxidized by the ambient oxygen to thoria which has, as is well known, a lower work function than thorium. The phenomena explains why thoriated electrodes (which ordinarily exhibit excellent starting characteristics) may fail to restart when cooled to ambient temperature if maintained in an essentially pure inert atmosphere. However, removal of the shielding atmosphere for a period (as brief as several seconds) can reactivate an electrode at ambient temperature.

The diffusion and transformation process of the thoria-to-thorium-to-thoria, appears to be a self-regulating process in a normal thoriated tungsten electrode. However, when an over abundance of thoria is present as a coating, it may be rapidly consumed as a result of a surface phenomenon. Such loss of surface emissive materials is probably attributable to cathodic sputtering.

The composite electrode of the invention represents a configuration wherein all previously mentioned unfavorable characteristics are eliminated and desired attributes are present; namely, the electrode has a circular cross-section for simple colletting, the emissive material such as thoria is concentrated to provide a good starting emission and yet its total content of approximately 0.5 percent or less is low enough to permit balling of the electrode end. The thoria is present in sufficient depth in the composite cross-section to provide the desired slow rate of diffusion. In addition, the composite electrode of the invention lends itself to be economically produced. The composite electrode shown in FIG. 4 was produced by starting with a composite electrode billet. Such billet was then swaged and drawn.

In operation, a pilot arc is energized between the electrodes 10 and 18, which reliably starts a welding arc between the electrode 10 and the work 14, even when the welding current is A.C., as in arc welding work that is aluminum, or any alloy thereof. In such case the pilot arc also helps stabilize the operation.

The principal advantages of the invention are realized in A.C. arc welding in which a pure tungsten electrode characteristic is desired, together with better than usual positive starting and higher than usual current capacity by virtue of the novel segment in the new electrode.

The emissive material in the segment may be present in an amount up to 2 percent by weight, and such material is preferably selected from the class consisting of oxides of barium, thorium, zirconium, cesium, lithium, lanthanum, strontium, potassium, and yttrium. Also, the electrode base may be some other suitable refractory metal such as molybdinum or tantalum instead of tungsten, if desired; as well as mixtures thereof.

What is claimed is:
1. Refractory electrode work-in circuit inert gas shielded-arc working apparatus, comprising the combination with an auxiliary electrode, of a composite main electrode, and means for energizing a pilot arc between the end of said auxiliary electrode and said composite main electrode to assist a working arc at the end of said main composite electrode in a stream of inert gas, said composite main electrode consisting of an elongated solid member consisting of a base composed of substantially pure refractory metal and a metal segment composed of a mixture of refractory metal and emissive material selected from the class consisting of barium, thorium, zirconium, cesium, lithium, lanthanum, strontium, potassium and yttirum, said segment having an external surface extending longitudinally of said electrode throughout the entire length thereof, which has a relatively low work-function compared to such base, whereby said composite electrode has the desirable "balling" characteristics of pure refractory metal even with A.C. together with positive starting.

2. A composite electrode for inert gas shielded arc working in the form of an elongated round stick consisting of a substantially pure tungsten base provided with an integral lateral segment composed of a mixture of tungsten and 0.5 percent–2.0 percent thoria extending from one end to the other of such stick, whereby said composite electrode has the desirable "balling" characteristics of pure tungsten even with A.C. together with positive starting.

3. A composite electrode in the form of an elongated member of uniform cross-section consisting of a base composed of substantially pure refractory metal, selected from the class consisting of tungsten, molybdinum and tantalum, said base having an integral lateral segment composed of a combination of refractory metal and emissive material selected from the class consisting of oxides of barium, thorium, zirconium, cesium, lithium, lanthanum, strontium, potassium and yttrium extending throughout the effective length of such electrode, the percentage of emissive material in said segment being sufficient to provide benefits similar to an electrode in which emissive material is dispersed throughout the structure thereof without adversely affecting its operation similar to an electrode that is composed of substantially pure refractory metal.

References Cited in the file of this patent

UNITED STATES PATENTS

| | | |
|---|---|---|
| 2,540,811 | Cobine | Feb. 6, 1951 |
| 2,892,072 | Miller | June 23, 1959 |
| 2,922,028 | Butler | Jan. 19, 1960 |